US012718202B2

(12) United States Patent
Gopathy et al.

(10) Patent No.: US 12,718,202 B2
(45) Date of Patent: Aug. 25, 2026

(54) UTILIZING USER-PROFILE TO PRIORITIZE PROCESSING OF MESSAGES

(71) Applicant: Cisco Technology, Inc., San Jose, CA (US)

(72) Inventors: Suresh Gopathy, Alpharetta, GA (US); Gajendar Pandey, Delhi (IN)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 18/525,754

(22) Filed: Nov. 30, 2023

(65) Prior Publication Data

US 2025/0182056 A1 Jun. 5, 2025

(51) Int. Cl.
*G06Q 10/107* (2023.01)
*G06Q 10/1093* (2023.01)
*H04L 51/42* (2022.01)

(52) U.S. Cl.
CPC ....... *G06Q 10/107* (2013.01); *G06Q 10/1093* (2013.01); *H04L 51/42* (2022.05)

(58) Field of Classification Search
None
See application file for complete search history.

(56) References Cited

U.S. PATENT DOCUMENTS 8,560,614 B2 10/2013 Morrey
2010/0211644 A1* 8/2010 Lavoie ................ G06Q 10/107 709/206
2010/0250498 A1 9/2010 Andersen
2020/0396190 A1 12/2020 Pickman
2021/0409355 A1 12/2021 Nagesha
2022/0166736 A1 5/2022 Freed
2022/0385619 A1 12/2022 Liao
2023/0244572 A1 8/2023 Liu

FOREIGN PATENT DOCUMENTS

WO WO-2024007644 A1 * 1/2024 ............ H04L 45/76

OTHER PUBLICATIONS

Chuang, C.E., et. al., "Send to me first: Priority in synchronous message-passing", Dec. 22, 2022, Journal of Functional Programming, pp. 1-40 (Year: 2022).*

* cited by examiner

*Primary Examiner* — Amanda Gurski
(74) *Attorney, Agent, or Firm* — Lee & Hayes, P.C.

(57) ABSTRACT

This disclosure describes techniques for prioritizing the scanning and delivery of messages based on an account status and/or activity pattern. A messaging service provider may receive a message that is to be delivered to a user of the messaging service. A message processing service of the service provider may also receive and/or extract metadata from the email that enables the message processing service to determine an account status of the user of the messaging service. The message processing service of the service provider may also receive and/or extract account utilization data that enables the message processing service to identify an activity pattern of the user of the messaging service. Using the account status and/or the activity pattern, the message processing service may assign a certain priority to the message, and accordingly place the message in a queue to be scanned. The email may then be scanned to identify email-based threats.

20 Claims, 8 Drawing Sheets

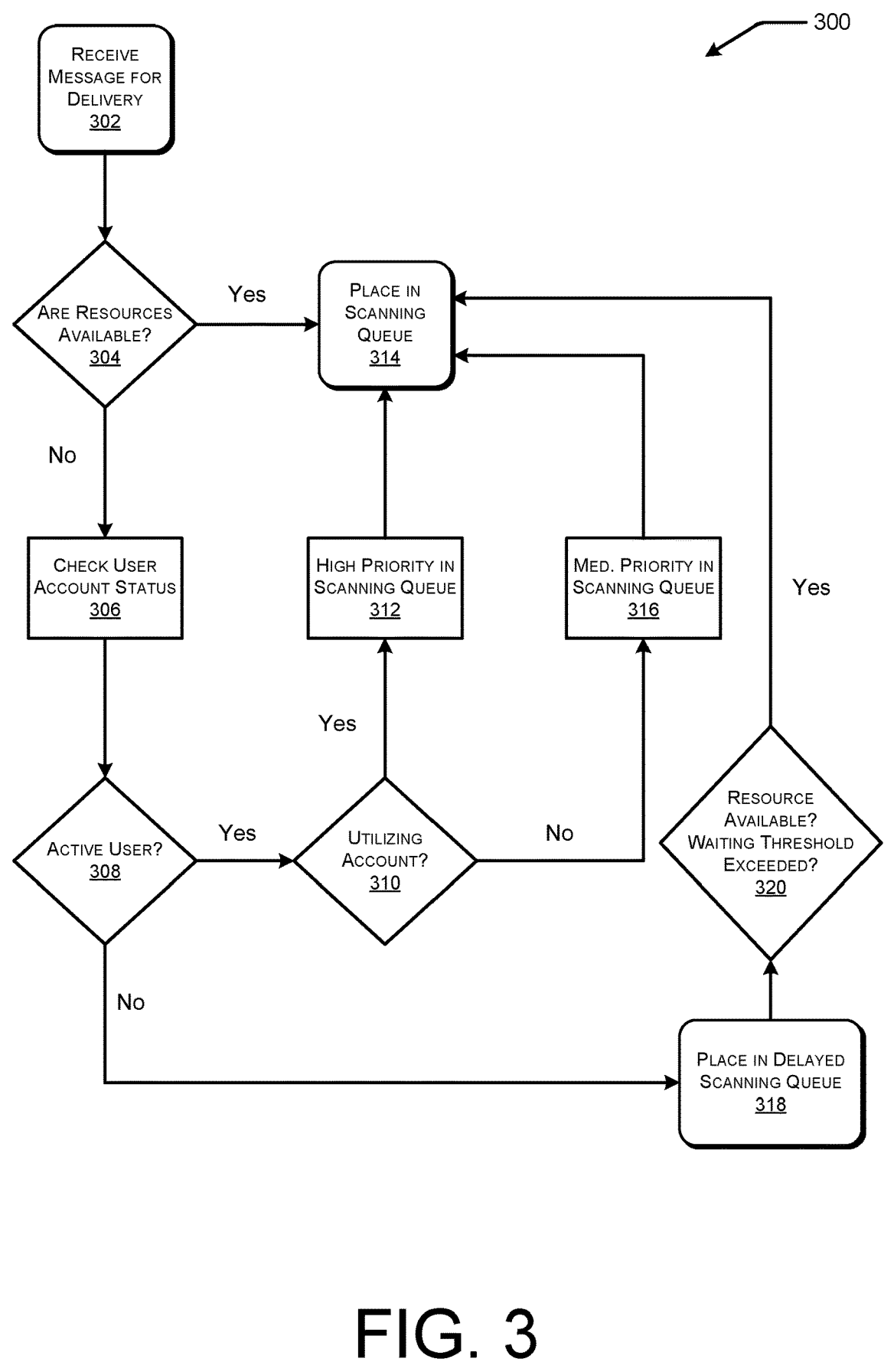

300

RECEIVE MESSAGE FOR DELIVERY 302

ARE RESOURCES AVAILABLE? 304

Yes

PLACE IN SCANNING QUEUE 314

No

CHECK USER ACCOUNT STATUS 306

HIGH PRIORITY IN SCANNING QUEUE 312

MED. PRIORITY IN SCANNING QUEUE 316

Yes

Yes

ACTIVE USER? 308

Yes

UTILIZING ACCOUNT? 310

No

RESOURCE AVAILABLE? WAITING THRESHOLD EXCEEDED? 320

No

PLACE IN DELAYED SCANNING QUEUE 318

FIG. 3

UTILIZING USER-PROFILE TO PRIORITIZE PROCESSING OF MESSAGES

TECHNICAL FIELD

The present disclosure relates generally to techniques for an email system to prioritize processing on inbound emails.

BACKGROUND

Electronic mail, or "email," continues to be a primary method of exchanging messages between users of electronic devices. Many messaging service providers have emerged that provide users with a variety of email platforms to facilitate the communication of emails via email servers that accept, forward, deliver, and store messages for the users. Email continues to be an important and fundamental method of communications between users of electronic devices as email provide users with a cheap, fast, accessible, efficient, and effective way to transmit all kinds of electronic data. Email is well established as a means of day-to-day, private communication for business communications, marketing communications, social communications, educational communications, and many other types of communications.

Due to the widespread use and necessity of email, hackers and other malicious entities use email as a primary channel for delivering malware and malware-less attacks against users. Accordingly, email security platforms are provided by messaging service providers (and/or third-party security service providers) that attempt to identify and eliminate attacks on email communication channels.

For instance, cloud messaging services provide secure email gateways (SEGs) that monitor emails for malicious content and implement pre-delivery protection by blocking email-based threats before they reach a mail server. These SEGs can scan incoming, outgoing, and internal communications for signs of malicious or harmful content. However, in order to keep up with the scanning of emails, SEGs must be scaled to peak traffic volume in order to meet computing resource needs and avoid latency issues.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example process for the placement of messages in scanning queues and/or delayed scanning queues based on resource availability and assigned priorities.

DESCRIPTION OF EXAMPLE EMBODIMENTS

Overview

Figure 1:
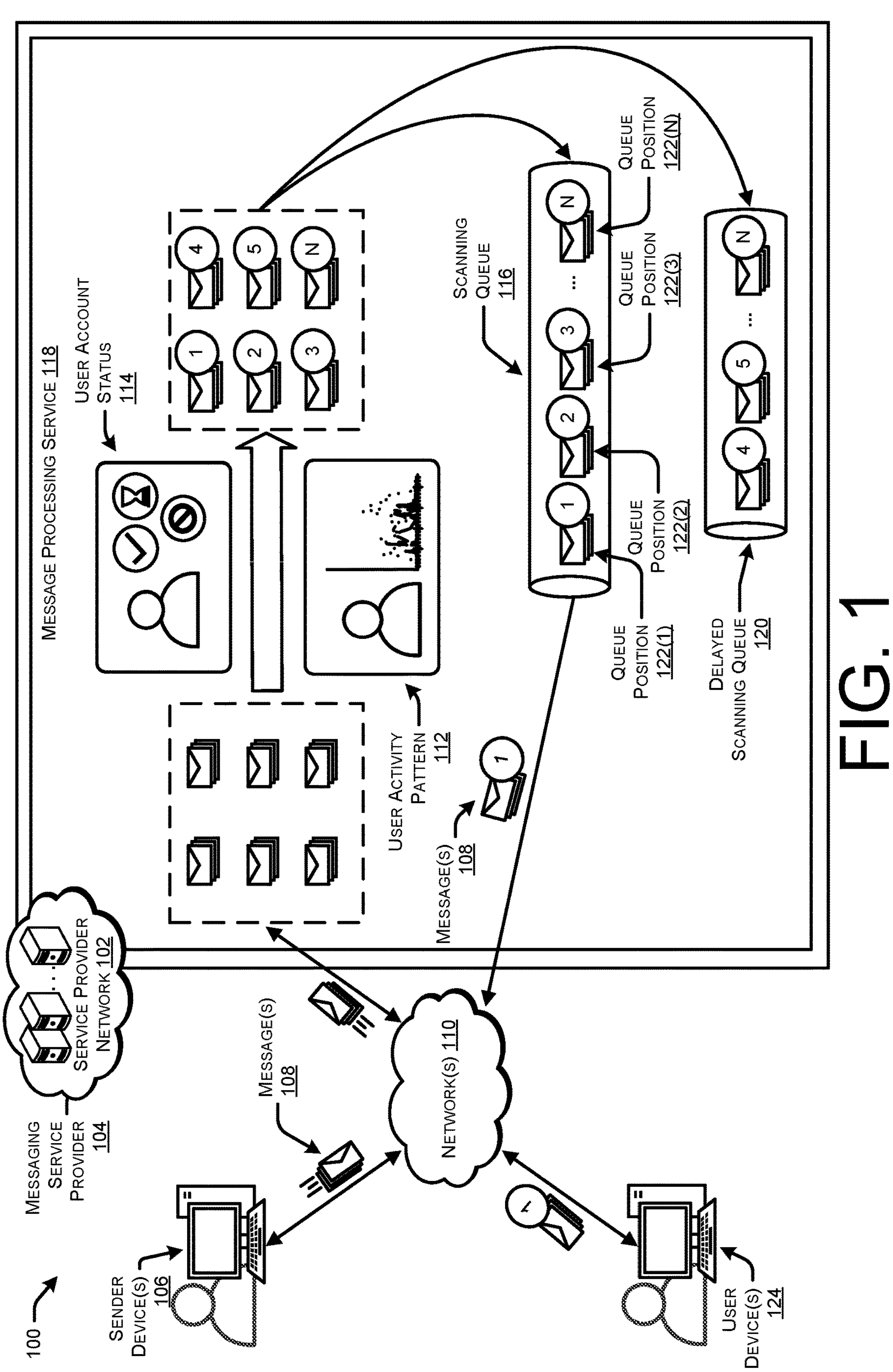
FIG. 1 illustrates an example environment in which a message processing service assigns priorities to incoming messages based on an account status and an activity pattern, and places the messages in a scanning queue based on the assigned priorities.

This disclosure describes techniques for prioritizing the scanning of incoming messages based on an account status and/or an activity pattern associated with the account receiving the message. A method to perform the techniques described herein includes receiving, at the messaging platform, a message to be processed and delivered to a messaging account of a user registered with a messaging service. Further, the method includes obtaining, at the messaging platform, account metadata associated with the messaging account. Additionally, the method includes determining, using the account metadata, an account status indicating an availability of the messaging account. The method may further include obtaining, at the messaging platform, account utilization data associated with the messaging account. Further, the method includes determining, using the account utilization data, an activity pattern indicating a pattern according to which the user interacts with their messaging account. Additionally, the method includes classifying, based at least in part on the account status and the activity pattern, the message as belonging to a priority class from among a group of priority classes. The method may further include based on the priority class of the message, placing the message at a particular position in a processing queue associated with the messaging platform, wherein the messaging platform processes messaged in the processing queue based at least in part on positions of the messages in the processing queue. Further, the method includes processing, by the messaging service, the message based at least in part on the position in the processing queue.

Additionally, the techniques described herein may be performed by a system and/or device having non-transitory computer-readable media storing computer-executable instructions that, when executed by one or more processors, performs the method described above.

Example Embodiments

This disclosure describes techniques for prioritizing the scanning of incoming messages based on an account status and/or an activity pattern associated with the account receiving the message. Traditionally, messaging service providers may scan and provide security analysis of messages for users of their messaging service. However, the security analysis performed by messaging service providers suffers from various inefficiencies, such as scaling the amount of computing resources necessary to perform the security analysis to accommodate peak traffic volumes, and in turn creating significant deployment costs.

According to the techniques described herein, a messaging service provider may receive an email (or another type of message) that is to be delivered to a user of the messaging service. A message processing service of the service provider may also receive and/or extract metadata from the email and/or the service provider that enables the message processing service to determine an account status of the user of the messaging service. The message processing service of the service provider may also receive and/or extract account utilization data that enables the message processing service to identify an activity pattern of the user of the messaging service. Using the account status and/or the activity pattern, the message processing service may assign a certain priority to the message, and accordingly place the message in a queue to be scanned. While the priority of the message determines the position in which it is placed in the queue, the position may also change as a result of resources becoming available and/or a certain amount of time passing. The email may then be scanned to identify email-based threats. In this way, computing resources required for email scanning may be scaled based on the number of prioritized emails.

To implement the techniques described herein, the message processing service and messaging service provider may work in unison. The messaging service provider may receive emails that are to be communicated to users of the messaging service and may send the emails to the message processing service for processing. The messaging service provider may also provide information to the message processing service associated with the user of the messaging that is receiving the email. After receiving the email, the message processing service may extract metadata from the email. The metadata may include, for example, a “Subject” of the email, content included in the body of the email, and so forth. The processing service may also receive and/or extract utilization data from the messaging service provider and/or other applications running on a device hosting the messaging service. The utilization data may include, for example, indications of a status set in the messaging service, an automatic out of office reply setting, a calendar setting in the messaging service, a request for time off in an organization management platform, and so forth. Using the metadata, the message processing service may determine an account status of the user of the messaging service. The account status may indicate whether the user is active, inactive, and/or temporarily away from using the messaging service.

The message processing service may also receive and/or extract account utilization data from the messaging service provider. The account utilization data may include, for example, an indication the user has opened the messaging service, clicked on links or URLs included in emails, opened attachments, replied to emails, deleted emails, and so forth. Using the account utilization data, the message processing service may determine an activity pattern of the user of the messaging service. For example, the activity pattern may indicate the user is actively browsing and/or interacting with the messaging service. Alternatively, the activity pattern may indicate the user is inactive.

The message processing service may use the account status and/or activity pattern to assign a priority to the email and place the email in a scanning queue. For example, the account status may indicate that the user is active. The activity pattern may also indicate that the user is actively browsing within the messaging service. Based on the account status and the activity pattern, the message processing service may assign the email with a priority so that the email is to be scanned first and place the email in the scanning queue. In another example, the account status may indicate that the user is active, but the activity pattern may indicate the user is not actively browsing within the messaging service. For example, the user may have temporarily stepped away from a device hosting the messaging service. In another example, the user may be interacting with a different application on the device hosting the messaging service. Based on the account status and the activity pattern, the message processing service may assign the email with a priority such that the email is placed in the scanning queue, but is to be scanned after other prioritized emails. In another example, the account status may indicate that the user is inactive. Based on the inactive account status, the message processing service may assign the email with a priority such that the email is placed in a delayed scanning queue and is to be scanned last. Based on the priority, the message processing service may then scan the email to identify email-based threats. The message processing service may also deploy additional resources based on the number of emails in the scanning queue with the first priority.

The message processing service may also monitor the availability of resources for scanning the emails. For example, the message processing service may receive the email to be delivered to the user of the messaging service, and determine there is a sufficient availability of resources to scan the email for signs of malicious or harmful content. As such, the message processing service may place the email in the scanning queue. Alternatively, the message processing service may determine there is an insufficient availability of resources to scan the email. When there is an insufficient availability of resources, the message processing service may then use the priority of the email to place the email in a position in the scanning queue or delayed scanning queue. When the email is placed in the delayed scanning queue, the availability of resources may change and become sufficiently available to scan the email. Based on the newly available resources, the email may be moved from the delayed scanning queue to a position in the scanning queue.

The message processing service may also periodically monitor an amount of time in which the email is placed in the delayed scanning queue. The message processing service may determine that the time in the delayed scanning queue has violated a threshold waiting time. As such, the email may be moved from the delayed scanning queue to a position in the scanning queue.

The techniques described herein improve the functioning of messaging service platforms as well as email security platforms. For example, secure email gateways (SEGs) provided by cloud messaging services scan for malicious email content before delivering the email to a user. SEGs may deploy virtual computing instances (e.g., virtual machines (VMs), containers, serverless functions, etc.) in order to support the scanning of emails. SEGs typically scale these virtual instances according to peak traffic volume in order to avoid latency in delivering emails and are unable to spin down the running VM instances. However, scaling the virtual instances to peak traffic volume may inefficiently use computing resources (e.g., CPU, GPU, RAM, etc.) and/or computing power, as the interaction between a user and their messaging service can fluctuate. Additionally, or alternatively, prompt scanning and delivery of emails may be futile when the user has temporarily stopped using the messaging service (e.g., when the user is out of office), and the email may not be viewed until the user has resumed using the messaging service. The high amount of computing resources required for scanning emails may result in large amounts of waste or misuse of computing resources. Additionally, or alternatively, customers of the message processing service in a cloud-based environment may have to pay more for the additional virtual instances scaled to peak traffic volume. Accordingly, the techniques described herein may increase efficiencies around the scanning and delivery of emails, which in turn improves utilization of computing resources, reduces the number of necessary VM instances, and reduces customer costs. Additionally, or alternatively, scanning and delivering emails when a user is active in a messaging service increases the likelihood the emails will be seen by the user.

The techniques described herein are with reference to a service provider network, such as a cloud provider network or platform, and networks such as VPCs, subnetworks (or "subnets"). However, the techniques are equally applicable to any network and in any environment. For example, the message processing service may monitor an on-premises network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 in which a message processing service 118 at a service provider network 102 assigns priorities to message(s) 108 based on a user account status 114 and a user activity pattern 112, and places the messages in a scanning queue based on the assigned priorities.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. In other instances, however, the service provider network 102 may be an on-premises network, a private network of a corporation, and/or any other type of network or combination thereof.

In some instances, the message processing service 118 may be a scalable service that includes and/or runs on devices housed or located in one or more data centers, that may be located at different physical locations. In some examples, the message processing service 118 may be included in a messaging platform and/or associated with a secure email gateway platform. The message processing service 118 and the messaging platform may be supported by networks of devices in a public cloud computing platform, a private/enterprise computing platform, and/or any combination thereof. The one or more data centers may be physical facilities or buildings located across geographic areas that are designated to store network devices that are part of and/or support the message processing service 118. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as process (CPU), memory (RAM), storage (disk), and networking (bandwidth).

The message processing service 118 may be associated with the messaging platform of a messaging service provider 104 and may generally comprise any type of messaging service provided by any provider, including public messaging service providers (e.g., Google Gmail, Microsoft Outlook, Yahoo! Mail, etc.), as well as private messaging service platforms maintained and/or operated by a private entity or enterprise. Further, the messaging service provider 104 may comprise cloud-based messaging service platforms (e.g., Google G Suite, Microsoft Office 365, etc.) that host messaging services. However, the messaging service provider 104 may generally comprise any type of platform for managing communication between clients or users, such as an email platform, a simple messaging service (SMS) platform, an audio/video communication platform, and so forth. The messaging service provider 104 may generally comprise a delivery engine behind email communications and include the requisite software and hardware for delivering email communications between users. For instance, an entity may operate and maintain the software and/or hardware of the messaging service provider 104 to allow users to send and receive emails, store and review emails in inboxes, manage and segment contact lists, build email templates, manage and modify inboxes and folders, scheduling, and/or any other operations performed using messaging service provider.

The message processing service 118 may be associated with an organization management platform. The organization management platform may comprise any type of management service provider, including public management providers (e.g., QuickBooks, ADP, Clockify, etc.) as well as private management platforms maintained and/or operated by a private entity or enterprise, such as an organization managing user device(s) 124. However, the organization management platform may generally comprise any type of platform for managing organization employees. For instance, an organization may operate and maintain the software and/or hardware of the organization management platform to allow employees to request time off.

The message processing service 118 may be included in, or associated with, the messaging service platform of the messaging service provider 104. For instance, the message processing service 118 may provide security analysis for emails communicated by the messaging service provider 104 (e.g., as a secure email gateway).

The messaging service provider 104 may provide one or more messaging services to users of user device(s) 124 to enable the user device(s) 124 to communicate emails. Sender device(s) 106 may communicate with user device(s) 124 over network(s) 110, such as the Internet. In some instances, the network(s) 110 may generally comprise one or more networks implemented by any viable communication technology, such as wired and/or wireless modalities and/or technologies. The network(s) 110 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 110 may include devices, virtual resources, or other nodes that relay packets from one device to another.

As illustrated, the user devices may include the sender device(s) 106 that send emails and the user device(s) 124 that receive the emails. The sender device(s) 106 and user device(s) 124 may comprise any type of electronic device capable of communicating using email communications. For instance, the devices 106/124 may include one or more of different personal user devices, such as desktop computers, laptop computers, phones, tablets, wearable devices, entertainment devices such as televisions, and/or any other type of computing device. Thus, the devices 106/124 may utilize the messaging service provider 104 to communicate using emails based on email address domain name systems according to techniques known in the art.

The messaging service provider 104 may receive emails that are destined for the user device(s) 124 that have access to inboxes associated with user email addresses managed by, or provided by, the messaging service provider 104. That is, emails, such as message(s) 108, are communicated over the network(s) 110 to one or more recipient servers of the messaging service platform, and the messaging service provider 104 determines which registered user the email is intended for based on email information such as "To," "Cc," Bcc," and the like. In instances where users of user device(s) 124 have registered for use of the message processing service 118, an organization managing the devices 106/124 has registered for use of the message processing service 118, and/or the messaging service provider 104 itself has registered for use of the message processing service 118, the messaging service provider 104 may provide the emails to the message processing service 118.

As illustrated, the message processing service 118 may receive message(s) 108 (i.e., an email or other type of message) that is to be delivered to user device(s) 124. Upon receiving the message(s) 108, the message processing service 118 may perform at least metadata extraction techniques on the message(s) 108. Additionally, or alternatively, the message processing service 118 may receive metadata from the messaging service provider 104 and/or a third-party system. In another example, the message processing service 118 may coordinate with the messaging service provider 104 and/or the third-party system to extract and/or receive metadata. The types of metadata that may be extracted and/or received by the message processing service 118 may include indications of the "Subject" of the message(s) 108, hashes of attachments, fuzzy hashes extracted from the message body of the message(s) 108, content from the body of the message(s) 108, data indicating user settings, etc. In another example, the types of metadata that may be extracted and/or received by the message processing service 118 and from applications running on user device(s) 124 include schedule data from a calendar associated with user device(s) 124, data indicating a request for time off, etc. Generally, the messaging service provider 104 and/or users of the messaging service may define what information is permitted to be extracted from the message(s) 108, and what information is too private or confidential and is not permitted to be extracted from the message(s) 108.

Upon extracting and/or receiving metadata from the message(s) 108 and/or applications running on the user device(s) 124, the message processing service 118 may determine a user account status 114 associated with the user of the user device(s) 124. For example, the message processing service 118 may analyze the metadata with reference to policies for determining whether or not the user of the user device(s) 124 is active, inactive, and/or temporarily unavailable. Additionally, or alternatively, the message processing service 118 may store an index of metadata associated with active, inactive, and/or temporarily away user accounts. In this example, the message processing service 118 may compare the metadata to the indexed metadata in order to determine the user account status 114.

In another example, the message processing service 118 may extract and/or receive account utilization data from the messaging service provider 104 and/or a third-party system. For example, the message processing service 118 may extract account utilization data by monitoring traffic patterns received through a SEG associated with the message processing service 118. Additionally, or alternatively, the message processing service 118 may coordinate with the messaging service provider 104 and/or a third-party system to extract and/or receive account utilization data. The types of account utilization data that may be extracted and/or received by the message processing service 118 may include data indicating the user of the user device(s) 124 has opened the messaging service, clicked on links within messages of the messaging service, opened attachments of the messages, replied to messages, deleted messages, etc. The account utilization data may be time-series data that may be periodically, or continuously, collected by the message processing service 118. Upon extracting and/or receiving the account utilization data from the messaging service provider 104, the message processing service 118 may determine a user activity pattern 112 associated with the user of the user device(s) 124.

The message processing service 118 may also determine a priority class of the message(s) 108 based on the user account status 114 and/or the user activity pattern 112. As described in more detail below with respect to FIG. 5, the priority class of the message(s) 108 may determine the position in which the message(s) 108 are placed in a scanning queue 116 and/or a delayed scanning queue 120. As illustrated, based on the priority class, message(s) 108 may be placed in queue positions 122(1), 122(2), 122(3), and/or 122(N) (where "N" is any integer greater than 1). Additionally, or alternatively, the message(s) 108 may be placed in the delayed scanning queue 120 based on priority class.

After the message(s) 108 are placed in scanning queue 116 and/or delayed scanning queue 120, the message(s) 108 may be scanned and/or analyzed by the message processing service 118 according to their relative queue position. For example, the message(s) 108 with queue position 122(1) will be scanned and/or analyzed before message(s) 108 with queue position 122(2). In another example, the message(s) 108 placed in the delayed scanning queue 120 will be scanned and/or analyzed after message(s) 108 in the scanning queue 116. The message processing service 118 may perform the analysis on the message(s) 108 using, among other techniques, security policies defined for the messaging service provider 104. The security policies may be defined or created by the messaging service provider 104 to detect potentially malicious messages (e.g., emails). The message processing service 118 may analyze the message(s) 108 with reference to the security policies to determine whether or not the message(s) 108 violate one or more security policies that indicate the message(s) 108 is potentially malicious. If the message(s) 108 does not violate the one or more security policies, the message processing service 118 may permit the message(s) 108 to be communicated between the devices 106/124.

Figure 2:
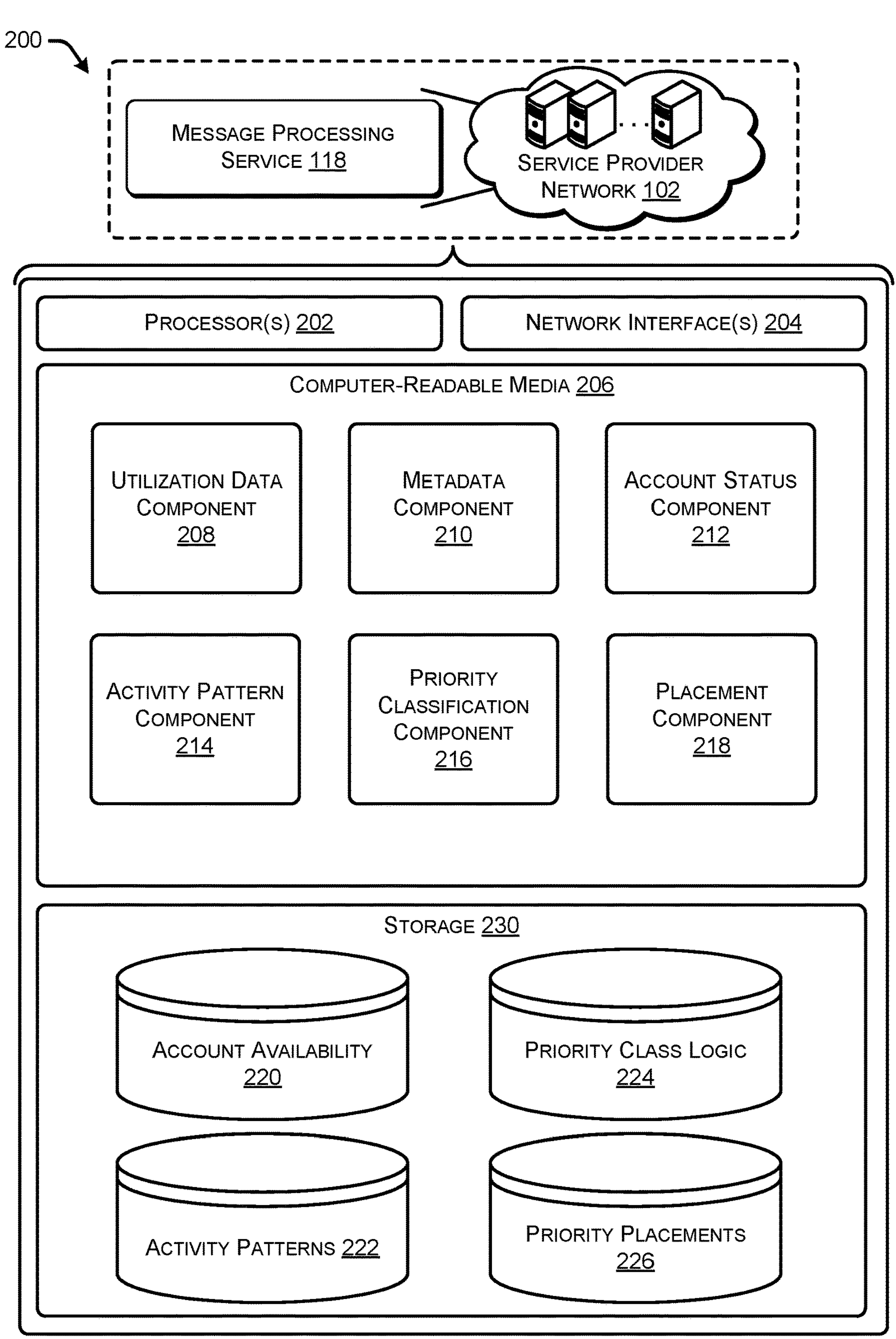
FIG. 2 illustrates a diagram of components of a message processing service.

FIG. 2 illustrates an example environment 200 of example components of the message processing service 118 at the service provider network 102. As illustrated, the service provider network 102 may include one or more hardware processor(s) 202 (processors) configured to execute one or more stored instructions. The processors 202 may comprise one or more cores. Further, the service provider network 102 may include network interface(s) 204 to allow the processors 202 or other portions of the service provider network 102 to communicate with other devices. The network interface(s) 204 may comprise Inter-Integrated Circuit (I2C), Serial Peripheral Interface bus (SPI), Universal Serial Bus (USB) as promulgated by the USB Implementers Forum, RS-232, and so forth. The network interface(s) 204 may include devices configured to couple to personal area networks (PANs), wired and wireless local area networks (LANs), wired and wireless wide area networks (WANs), and so forth. For example, the network interface(s) 204 may include devices compatible with Ethernet, Wi-Fi™, and so forth.

The service provider network 102 may also include computer-readable media 206 that stores various executable components (e.g., software-based components, firmware-based components, etc.). In addition to various components discussed in FIG. 1, the computer-readable media 206 may further store components to implement functionality described herein. While not illustrated, the computer-readable media 206 may store one or more operating systems utilized to control the operation of the one or more devices that comprise the service provider network 102. The operating systems may implement a variant of the FreeBSD™ operating system as promulgated by the FreeBSD Project: other UNIX™ or UNIX-like variants: a variation of the Linux™ operating system as promulgated by Linus Torvalds: the Windows® Server operating system from Microsoft Corporation of Redmond, Washington, USA; and so forth.

The computer-readable media 206 may include a metadata component 210 that configures the message processing service 118 to perform various operations described herein. For instance, the metadata component may be configured to, when executed by the processors 202, perform various techniques for extracting and/or receiving metadata from the messaging service provider and/or applications running on the user device. The metadata component 210 may utilize data indicating whether the user is active, inactive, or temporarily unavailable. The computer-readable media 206 may also include a priority classification component 216 that configures the message processing service 118 to perform various operations described herein. The priority classification component 216 may work in conjunction with the metadata component 210 to determine an account status of the user. For instance, the metadata component may extract and/or receive metadata indicating the "Subject" messages, hashes of attachments, fuzzy hashes extracted from the message body of the messages, content from the body of the messages, data indicating user settings, etc. In another example, the types of metadata that may be extracted and/or received by metadata component 210 may include schedule data from a calendar associated with the user device, data indicating a request for time off, etc. The account status component 212 may then use the metadata to identify an account status of the user. In one example, the metadata component 210 and/or the account status component 212 may extract metadata for determining the account status of a user by establishing connections (e.g., API calls) with an application of a messaging service provider and/or a third-party system. Additionally, or alternatively, the metadata component 210 and/or the account status component 212 may work in conjunction with the messaging service provider and/or the third-party system to extract and/or receive metadata for determining the account status of the user.

The computer-readable media 206 may include a utilization data component 208 that configures the message processing service 118 to perform various operations described herein. For instance, the utilization data component 208 may be configured to, when executed by the processors 202, perform various techniques for extracting or receiving utilization data from a messaging service provider. The utilization data component 208 may utilize data indicating the interactions between a user of a user device and a messaging service. The computer-readable media 206 may also include an activity pattern component 214 that configures the message processing service 118 to perform various operations described herein. The activity pattern component 214 may work in conjunction with the utilization data component 208 to determine an activity pattern of the user. For instance, the utilization data component 208 may extract and/or receive utilization data indicating the user of the user device has opened the messaging service, clicked on links within messages of the messaging service, opened attachments of the messages, replied to messages, deleted messages, etc. The activity pattern component 214 may use the utilization data to identify an activity pattern of the user. In one example, the utilization data component 208 and/or the activity pattern component 214 may extract utilization data for determining the activity pattern of the user by monitoring traffic patterns received through a SEG associated with the message processing service 118. Additionally, or alternatively, the utilization data component 208 and/or the activity pattern component 214 may work in conjunction with a messaging service provider and/or a third-party system to extract and/or receive account utilization data for determining the activity pattern of the user.

The computer-readable media 206 may include a priority classification component 216 that configures the message processing service 118 to perform various operations described herein. For instance, the priority classification component 216 may be configured to, when executed by the processors 202, perform various techniques for determining a priority class of messages to be scanned and delivered to a user. The priority classification component 216 may use the account status and/or activity pattern of the user to determine the priority class of messages.

The computer-readable media 206 may include a placement component 218 that configures the message processing service 118 to perform various operations described herein. For instance, the placement component 218 may be configured to, when executed by the processors 202, perform various techniques for placing messages in positions in a queue for scanning and delivery to a user. The placement component 218 may use the priority class of messages to determine the placement of the messages in positions in the queue.

Additionally, the service provider network 102 may include storage 230 which may comprise one, or multiple, repositories or other storage locations for persistently storing and managing collections of data such as databases, simple files, binary, and/or any other data. The storage 230 may include one or more storage locations that may be managed by one or more storage/database management systems.

As illustrated, the storage 230 may include account availability 220, activity patterns 222, priority class logic 224, and priority placements 226. It should be appreciated that the foregoing list is merely exemplary and the storage 230 may include additional elements that may be apparent to one skilled in the art.

The account availability 220 may include a database of accounts that are determined to have an account status of inactive or temporarily unavailable. For instance, accounts associated with metadata such as a user setting of "do not disturb" or "out of office" may be included in the account availability 220. The account availability 220 may also include metadata associated with inactive and/or temporarily away user accounts for use in determining an account status. For example, the account status component 212 may reference the account availability 220 to determine similarities between users with an inactive and/or temporarily unavailable status, and another user.

The activity patterns 222 may include a database of user activity patterns of users. The database may be formed as a historical compilation of utilization data obtained by the message processing service 118.

The priority class logic 224 may include a database of logic for determining a priority class for a message. For example, the priority classification component 216 may reference account availability 220, activity patterns 222, and/or priority class logic 224 in determining a priority class to assign to a message.

The priority placements 226 may store the results of the placement component 218. Additionally, or alternatively, the priority placements 226 may include a database formed as a historical compilation of message placements, and the placement component 218 may reference the priority placements 226 in placing a message in a queue position. For example, the placement component 218 place the message in a different queue position based on a threshold waiting time in which the message has been placed in the queue position.

Additionally, or alternatively, the message processing service 118 may store an index of metadata associated with active, inactive, and/or temporarily away user accounts. In this example, the message processing service 118 may compare the metadata to indexed in order to determine the user account status 114.

FIG. 3 illustrates a flow diagram of an example process 300 for the placement of messages in scanning queues and/or delayed scanning queues by the message processing service 118 based on resource availability and assigned priorities.

At 302, the message processing service 118 may receive messages to be delivered to a user device by a messaging service provider.

At 304, a determination that there are resources available for scanning and delivering the message to the user (i.e., a "Yes" at operation 304) the process 300 may proceed to operation 314.

At 314, the message processing service 118 may place the message in a scanning queue to be scanned and delivered to the user.

At 304, a determination that there are insufficient resources available for scanning and deliver the message to the user (i.e., a "No" at operation 306") the process 300 may proceed to operation 306.

At 306, the message processing service 118 may identify the account status of the user. For example, the account status component 212 may use a look-up table of inactive and/or temporarily unavailable users in the database of account availability 220 within the storage 230.

At 308, a determination that the user is inactive and/or temporarily unavailable (i.e., a "No" at operation 308), the process 300 may proceed to operation 318.

At 318, the message processing service 118 may place the message to be delivered to the inactive and/or temporarily unavailable user in a delayed scanning queue.

At 320, the message processing service 118 may make a determination that resources have become available for scanning and delivering the message to the user, and the process 300 may proceed to operation 314. Additionally, or alternatively, the message processing service 118 may make a determination that a waiting threshold has been exceeded in which the message has been placed in the delayed scanning queue, and the process 300 may proceed to operation 314.

At 308, a determination that the user is active (i.e., a "Yes" at operation 308) the process 300 may proceed to operation 310.

At 310, a determination that the active user is utilizing their account associated with a messaging service (i.e., a "Yes" at operation 310), the process 300 may proceed to operation 312.

At operation 312, the message is given a high priority and placed in the scanning queue, and the process 300 may proceed to operation 314.

At 310, a determination that the active user is not utilizing their account associated with the messaging service (i.e., a "No" at operation 310), the process 300 may proceed to operation 312.

At operation 312, the message is given a medium priority and placed in the scanning queue, and the process 300 may proceed to operation 314.

Figure 4:
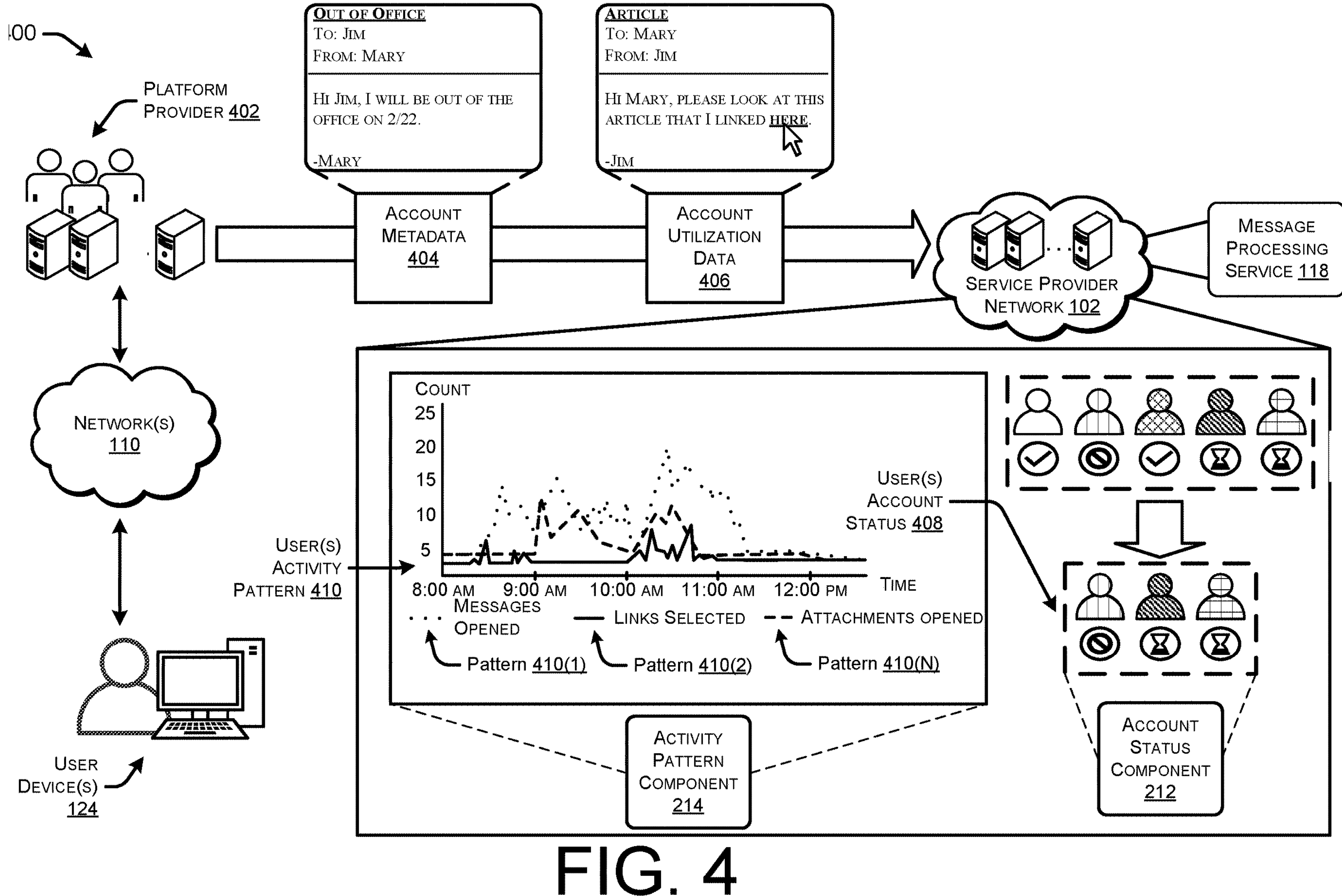
FIG. 4 illustrates an example environment in which the message processing service determines an account status and an activity pattern.

FIG. 4 illustrates an example environment 400 in which the message processing service 118 determines an account status and an activity pattern for users of user device(s) 124 communicating over network(s) 110.

In order to process incoming messages to be delivered to the users of user device(s) 124, the message processing service 118 may obtain account metadata 404 and/or account utilization data 406 from a platform provider 402. The account metadata 404 may be extracted from messages from the platform provider 402 and/or may be received directly from the platform provider 402. In one example, the platform provider 402 may be a messaging service provider. Additionally, or alternatively, the platform provider 402 may be an organization management platform providing applications on user device(s) 124 associated with the organization. The message processing service 118 may extract account metadata 404 by monitoring the incoming messages for one or more keywords. The types of account metadata 404 that may be extracted and/or received by the message processing service 118 may include indications of the "Subject" of messages, hashes of attachments, fuzzy hashes extracted from the message body, content from the body of messages, data indicating user settings, etc. For example, account metadata 404 as illustrated may include indications of an "Out of Office" subject line, or an automatic "Out of Office" reply. Additionally, or alternatively, the content of the message may include an indication of an "Out of Office" date, and/or keywords such as "vacation," "paid time off," "request for leave," and the like.

In another example, the types of account metadata 404 that may be extracted and/or received by the message processing service 118 from applications running on the user device(s) 124 and/or associated with an organization management platform. For example, the message processing service 118 may establish connections (e.g., application programming interface (API) calls) with a calendar application running on the user device(s) 124. The message processing service 118 may expose the calendar application interface, and in turn extract account metadata 404 such as schedule data indicating when periods of time have been "blocked off" on a calendar. In another example, the message processing service 118 may expose an interface of an employer/employee application, where account metadata 404 may include a request for time off. Additionally, or alternatively, the message processing service 118 may expose an interface of a different messaging application, where account metadata 404 may include an indication that the user of user device(s) 124 is engaged in a call, video chat, and the like.

Upon extracting and/or receiving the account metadata 404, the account status component 212 of the message processing service 118 may determine a user(s) account status 408 associated with users of the user device(s) 124. For example, the account status component 212 may analyze account metadata 404 with reference to policies for determining whether or not the user of the user device(s) 124 is active, inactive, and/or temporarily away. Additionally, or alternatively, the message processing service 118 may store an index of account metadata 404 associated with active, inactive, and/or temporarily away user accounts. For example, the message processing service 118 may compare the account metadata 404 with account metadata 404 that has been indexed and associated with an account status. Based on the account metadata 404, the account status component 212 may determine the user(s) account status 408. The user(s) account status 408 may include an active status, an inactive status, and/or a temporarily away status. The account status component 212 may then store accounts associated with the inactive or temporarily away user(s) account status 408 at the database of account availability 220 of the storage 230.

Account utilization data 406 may be extracted from the platform provider 402 and/or may be received directly from the platform provider 402, such as a messaging service provider. For example, the message processing service 118 may directly monitor messages received by the platform provider 402. Additionally, or alternatively, the message processing service 118 may establish connections (e.g., API calls) with application(s) of the platform provider 402. The account utilization data 406 that may be extracted and/or received by the message processing service 118 may include an indication the user has opened the messaging service, clicked on links or URLs included in messages, opened attachments, replied to messages, deleted messages, and so forth. For example, the account utilization data 406 as illustrated may include a link that is clicked on.

Upon extracting and/or receiving the account utilization data 406, the activity pattern component 214 of the message processing service 118 may determine user(s) activity pattern 410 associated with users of the user device(s) 124. For example, the activity pattern component 214 may receive account utilization data 406 indicating a pattern 410(1) in which a user opens messages. In this example, the user may begin to open messages frequently from 9:00 a.m. until 11:30 a.m., then stop opening as many around 12:00 p.m. In another example, the activity pattern component 214 may receive account utilization data 406 indicating a pattern 410(2) in which the user clicks on links. In this example, the user frequently clicks on links from 10:00 a.m. until 11:00 a.m. In another example, the activity pattern component 214 may receive account utilization data 406 indicating a pattern 410(N) (where "N" is any integer greater than 1). Here, pattern 410(N) is a pattern in which the user opens attachments. In this example, the user frequently opens attachments form 10:00 a.m. until 11:00 a.m. Based on the patterns, the activity pattern component 214 may determine the user(s) activity pattern 410.

In another example, the activity pattern component 214 may determine, based on the account utilization data 406, certain periods of time the user of the user device(s) 124 is typically active. For example, the user may be heavily active on the user device(s) 124 (e.g., frequently writing and/or responding to messages) in certain periods of the day, such as early in the morning. In another example, the user may typically be inactive on the user device(s) 124 during the lunch hour. Using the periods of time the user of the user device(s) 124 is typically active, the activity pattern component 214 may determine the user(s) activity pattern 410 based on irregularities form the typical activity.

Figure 5:
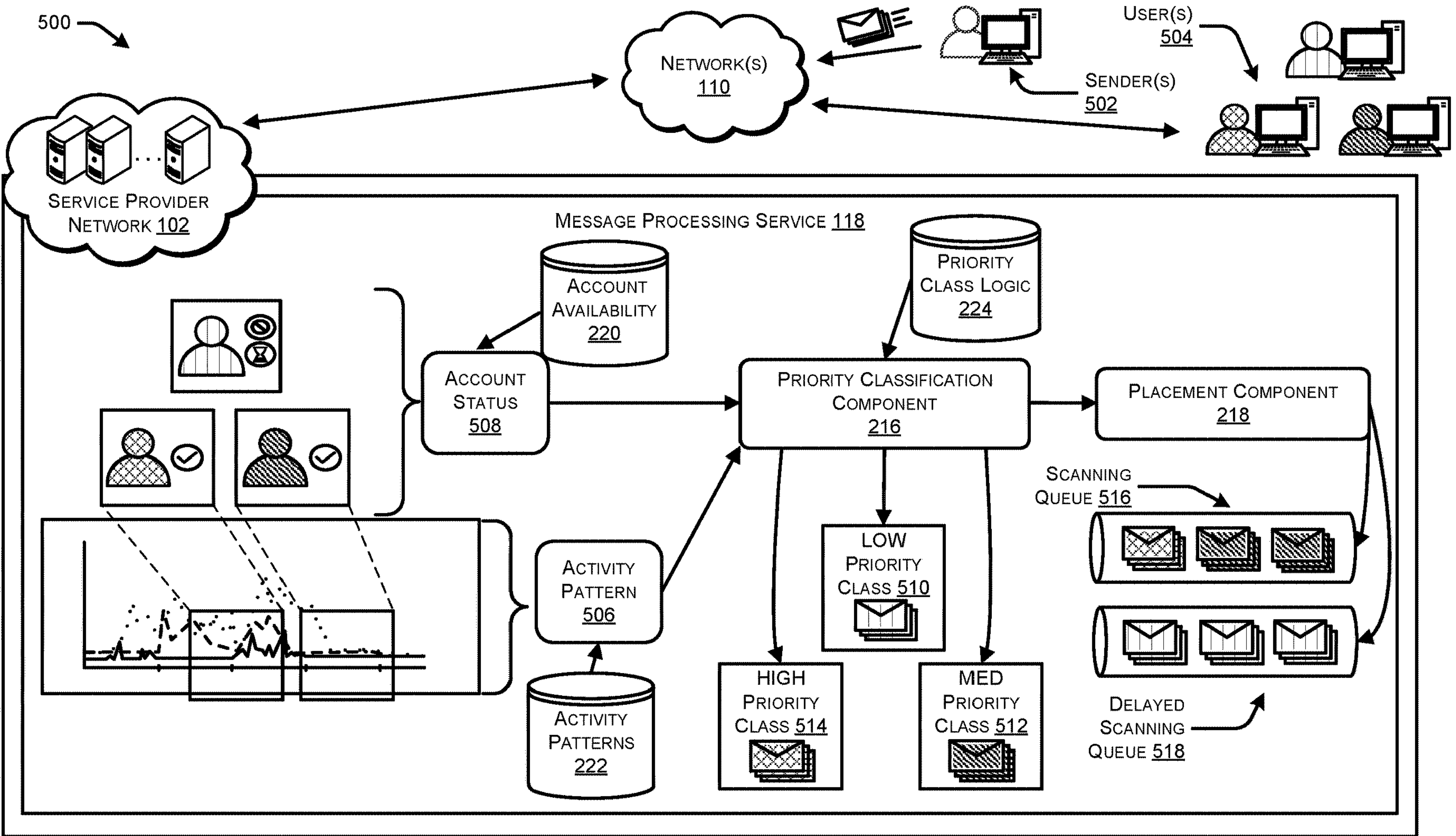
FIG. 5 illustrates an example environment in which the message processing service assigns priorities to inbound messages and places the messages in queues according to their assigned priority.

FIG. 5 illustrates an example environment 500 in which the message processing service 118 assigns priorities to inbound messages sent over network(s) 110, and places the messages in queues according to their assigned priority.

In one example, a message may be sent from sender(s) 502 to user(s) 504 over network(s) 110, where the messages may be processed by the message processing service 118 at the service provider network 102. In this example, the message processing service 118 uses account status 508 from the database of account availability 220 and/or activity pattern 506 from the database of activity patterns 222 to determine processing priorities of the messages. Using the account status 508 and/or the activity pattern 506, the priority classification component 216 may use priority logic from the database of priority class logic 224 for determining priority.

For example, the priority classification component 216 may receive account status 508 indicating the user(s) 504 has an active status. Additionally, or alternatively, the priority classification component 216 may receive an activity pattern 506 indicating the user(s) 504 is actively using their messaging service. Based on this, the priority classification component may assign the message with a high priority classification 514. In another example, the account status 508 may indicate the user(s) 504 has an active status, but the activity pattern 506 may indicate the user(s) 504 is not actively using their messaging service. Based on this, the priority classification component may assign the message with a medium priority classification 512. In another example, if the account status 508 indicates the user(s) 504 has an inactive status or may be temporarily away, the priority classification component 216 may assign the message with a low priority classification 510.

Based on the high priority classification 514, the medium priority classification 512, and/or the low priority classification 510, the placement component 218 may place the messages in a position in a queue, where the position determines the order in which the messages are scanned and delivered to the user(s) 504. For example, a message with the high priority classification 514 may be placed in a first position in scanning queue 516, where the message will be scanned and delivered to the user(s) 504 first. Additionally, or alternatively, a message with the medium priority classification 512 may be placed in a second position in the scanning queue 516, where the message will be scanned and delivered to user(s) 504 after messages with the high priority classification 514. Additionally, or alternatively, a message with the low priority classification 510 may be placed in a delayed scanning queue 518.

In another example, a message may be assigned a high priority classification 514 when a threshold of allocated computing resources has already been met. For example, computing resources may be auto scaled to process a maximum of five messages, but a sixth message received by the message processing service 118 is assigned with the high priority classification 514. In this example, the message with the high priority classification 514 may not be placed in the first position in the scanning queue 516.

The placement component 218 may also monitor the availability of resources for scanning and delivering messages to user(s) 504. For example, when a message is received, the placement component 218 may determine that there are sufficient computing resources available for scanning and delivering the message to user(s) 504. When there are sufficient computing resources, the messages may be placed in the scanning queue 516 without being assigned the high priority classification 514, the medium priority classification 512, and/or the low priority classification 510. Additionally, or alternatively, the placement component 218 may periodically audit the availability of resources and move messages in positions in the delayed scanning queue 518 to positions in the scanning queue 516. For example, there may have been insufficient computing resources to scan and deliver a message with the low priority classification 510 and accordingly placed in the delayed scanning queue 518. However, the placement component 218 may determine that there are now sufficient computing resources to scan and deliver the message with the low priority classification 510 and may move the message to the scanning queue 516.

In another example, the placement component 218 may monitor an amount of time a message with the low priority classification 510 is positioned in the delayed scanning queue. In this example, the message processing service 118 may use a predetermined threshold value in which a message may be positioned in the delayed scanning queue 518. When the amount of time the message with the low priority classification 510 is positioned in the delayed scanning queue 518 violates the threshold, the placement component 218 may move the message to the scanning queue 516.

Figure 6:
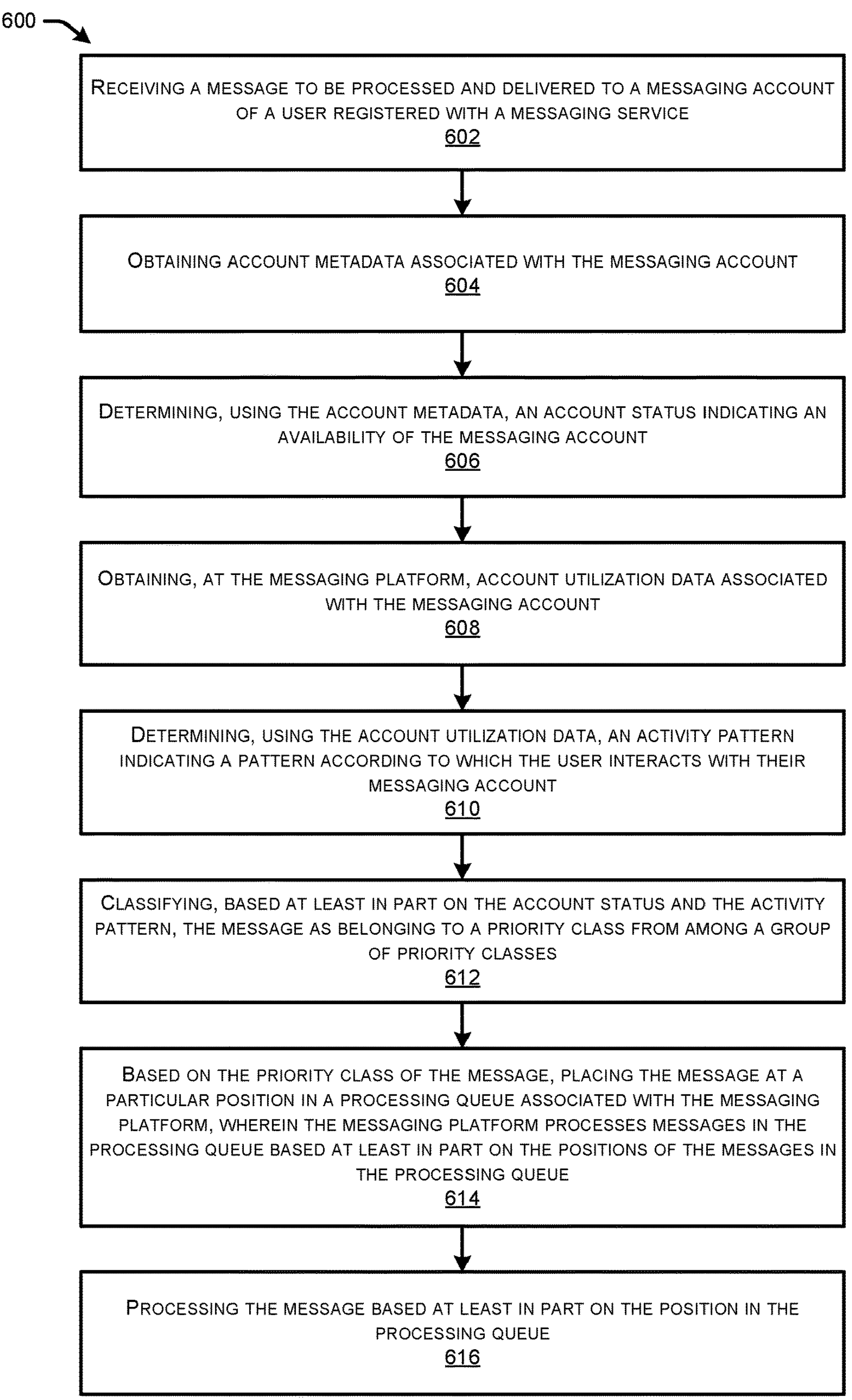
FIG. 6 illustrates a flow diagram of an example method for determining an account status and an activity pattern, assigning priorities to a message based on the account status and activity pattern, and placing the message in a position in a processing queue based on the assigned priority.

FIG. 6 illustrates a flow diagram of an example process 600 determining an account status and an activity pattern, assigning priorities to a message based on the account status and activity pattern, and placing the message in a position in a processing queue based on the assigned priority. The techniques may be applied by a system comprising one or more processors, and one or more non-transitory computer-readable media storing computer-executable instructions that, when executed by the one or more processors, cause the one or more processors to perform operations of process 600.

The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

At block 602, the process 600 may include receiving, at a messaging platform, a message to be processed and delivered to a messaging account of a user registered with a messaging service. For example, the messaging service provider may receive emails that are destined for user device(s) that have access to inboxes associated with user email addresses managed by, or provided by, the messaging service provider. That is, emails are communicated over the network(s) to one or more recipient servers of the messaging service provider, and the messaging service provider determines which registered user the email is intended for based on email information such as "To," "Cc." Bcc," and the like. In instances where users of user device(s) have registered for use of the message processing service, an organization managing the devices has registered for use of the message processing service, and/or the messaging service provider itself has registered for use of the message processing service, the messaging service provider may provide the emails to the message processing service.

At block 604, the process 600 may include obtaining, at the messaging platform, account metadata associated with the messaging account. In this example, the message processing service may perform at least metadata extraction techniques on the messages. Additionally, or alternatively, the message processing service may receive metadata from the messaging service provider. The types of metadata that may be extracted and/or received by the message processing service may include indications of the "Subject" of the messages, hashes of attachments, fuzzy hashes extracted from the message body of the message, content from the body of the message(s), data indicating user settings, etc. In another example, the types of metadata that may be extracted and/or received by the message processing service and from applications running on user device(s) include schedule data from a calendar associated with user device(s), data indicating a request for time off, etc.

At block 606, the process 600 may include determining, using the account metadata, an account status indicating an availability of the messaging account. In this example, the message processing service may analyze the metadata with reference to policies for determining whether or not the user of the user device(s) is active, inactive, and/or temporarily away. Additionally, or alternatively, the message processing service may store an index of metadata associated with active, inactive, and/or temporarily away user accounts. In this example, the message processing service may compare the metadata to the indexed metadata in order to determine the user account status.

At block 608, the process 600 may include obtaining, at the messaging platform, account utilization data associated with the messaging account. In this example, the message processing service may extract and/or receive account utilization data from the messaging service provider. The types of account utilization data that may be extracted and/or received by the message processing service may include data indicating the user of the user device(s) 124 has opened the messaging service, clicked on links within messages of the messaging service, opened attachments of the messages, replied to messages, deleted messages, etc. The account utilization data may be time-series data that may be periodically, or continuously, collected by the message processing service.

At block 610, the process 600 may include determining, using the account utilization data, an activity pattern indicating a pattern according to which the user interacts with their messaging account.

At block 612, the process 600 may include classifying, based at least in part on the account status and the activity pattern, the message as belonging to a priority class from among a group of priority classes. As an example, a priority classification component may receive account status indicating the user has an active status. Additionally, or alternatively, the priority classification component may receive an activity pattern indicating the user is actively using their messaging service. Based on this, the priority classification component may assign the message with a high priority classification. In another example, the account status may indicate the user has an active status, but the activity pattern may indicate the user(s) 504 is not actively using their messaging service. Based on this, the priority classification component may assign the message with a medium priority classification. In another example, if the account status indicates the user has an inactive status or may be temporarily away, the priority classification component may assign the message with a low priority classification.

At block 614, the process 600 may include, based on the priority class of the message, placing the message at a particular position in a processing queue associated with the messaging platform, wherein the messaging platform processes messaged in the processing queue based at least in part on positions of the messages in the processing queue. In this example, a message with the high priority classification may be placed in a first position in scanning queue, where the message will be scanned and delivered to the user(s) first. Additionally, or alternatively, a message with the medium priority classification may be placed in a second position in the scanning queue, where the message will be scanned and delivered to user(s) after messages with the high priority classification. Additionally, or alternatively, a message with the low priority classification may be placed in a delayed scanning queue.

At block 616, the process 600 may include processing, by the messaging service, the message based at least in part on the position in the processing queue. In this example, after the messages are placed in scanning queue and/or delayed scanning queue, the message may be scanned and/or analyzed by the message processing service according to their relative queue position.

Additionally, or alternatively, the process 600 may include, wherein the processing queue is a first processing queue, and the messaging platform is running as a first instance of the messaging platform associated with the first processing queue, determining an availability of resources associated with the first instance of the messaging service or a second instance of the messaging service. The process 600 may also include, based at least in part on the availability of the resources, moving the message from the first queue to a second queue associated with the second instance of the messaging service.

Additionally, or alternatively, the process 600 may include, wherein the processing queue is a first processing queue, determining a threshold waiting time associated with the first processing queue. The process 600 may also include determining that a waiting time associated with the message violates the threshold waiting time and moving the message from the first queue to a second queue based on the waiting time violating the threshold waiting time.

Additionally, or alternatively, the process 600 may include, wherein the priority class is a first priority class, the message is a first message, the account status is a first account status, and the messaging account is a first messaging account, receiving, at the messaging platform, a second message to be processed and delivered to a second messaging account. The process 600 may also include classifying, based at least in part on a second account status associated with the second messaging account, the second message as a second priority class from among the group of priority classes. Further, the process 600 may include based on the second priority class, placing the second message at another location in the processing queue, wherein the second message is to be processed after the first message.

Additionally, or alternatively, the process 600 may include determining an availability of resources associated with the messaging service and based at least in part on the availability of the resources, placing the message at the particular position in the processing queue associated with the messaging platform.

Additionally, or alternatively, the process 600 may include, wherein obtaining the account metadata comprises one or more of analyzing a subject of one or more user messages, analyzing contents of the one or more user messages, receiving schedule data from a calendar associated with the user messaging account, or obtaining data indicating user settings associated with the user messaging account.

Additionally, or alternatively, the process 600 may include, wherein obtaining the account utilization data comprises one or more of obtaining data indicating that the user opened the messaging service, obtaining data indicating that the user clicked on links associated with one or more messages, obtaining data indicating that the user opened attachments associated with the one or more messages, obtaining data indicating that the user replied to the one or more messages, or obtaining data indicating that the user deleted the one or more messages.

Figure 7:
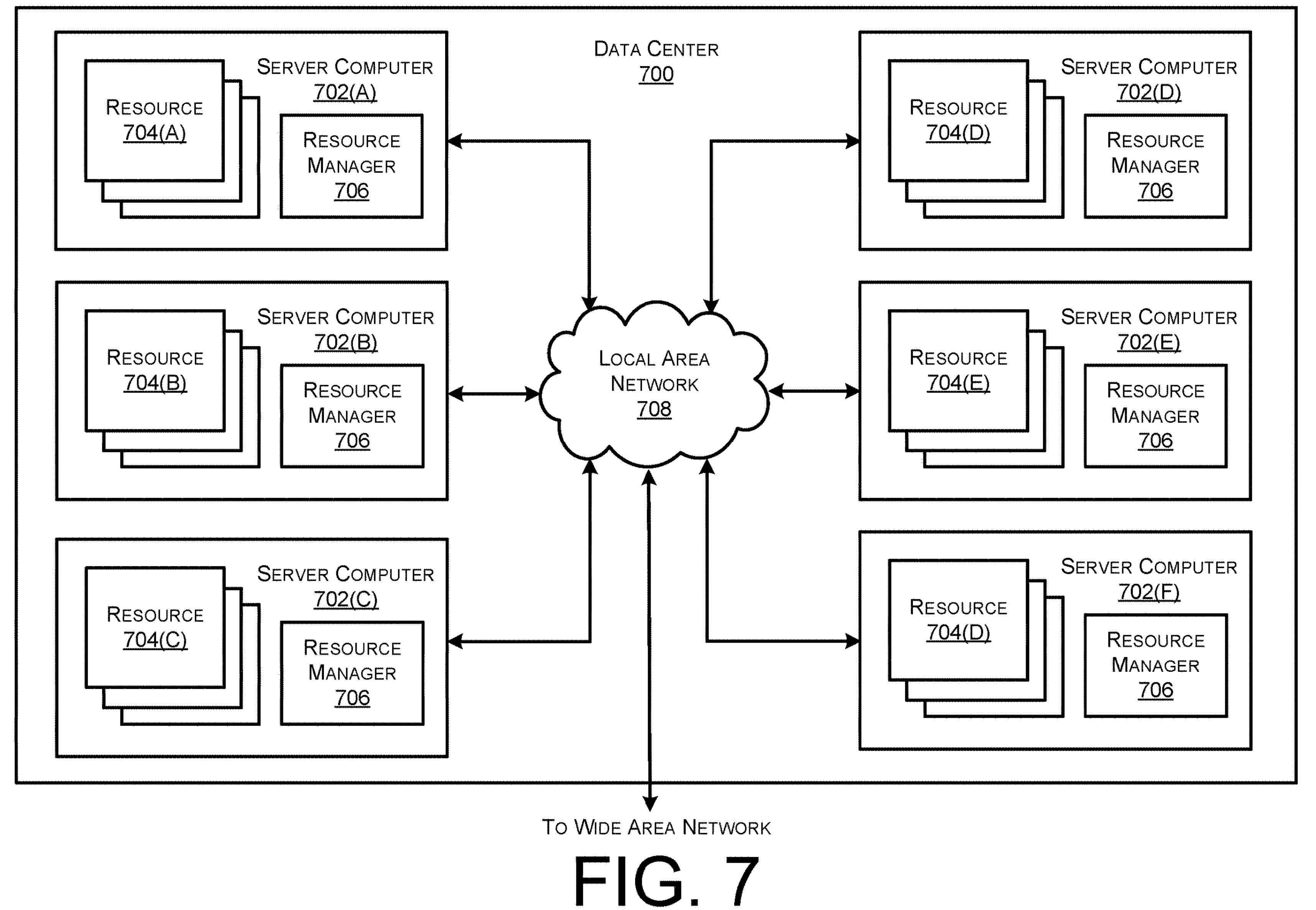
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. In one example, the data center 700 may be used to support the message processing service 118 and/or the messaging service provider 104. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, the any type of networked device described herein. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services. In one example, server computers 702 may be used to support the message processing service 118 and/or the service provider network 102.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
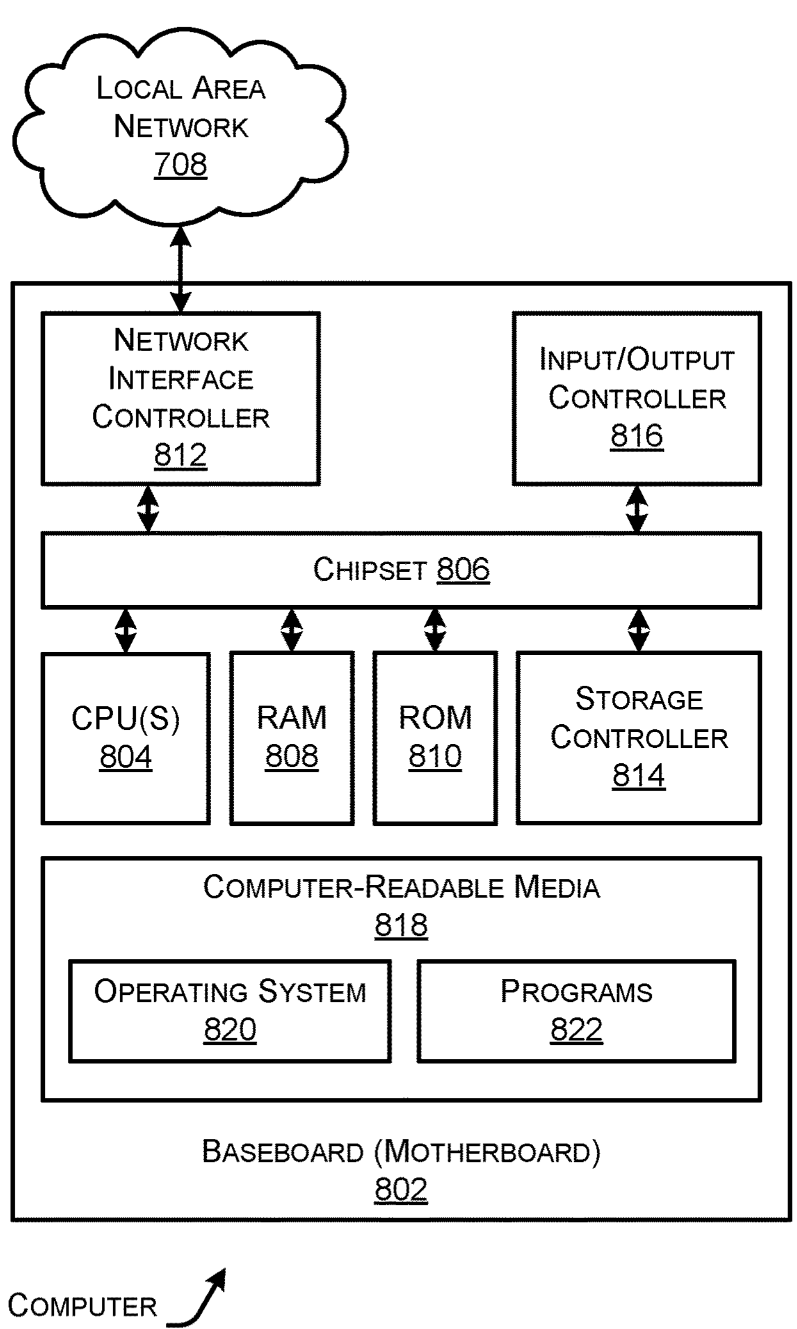
FIG. 8 is a computer architecture diagram showing an illustrative computer hardware architecture for implementing a computing device that can be utilized to implement aspects of the various technologies presented herein.

FIG. 8 shows an example computer architecture for a server computer 702 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The server computer 702 may, in some examples, correspond to a physical server and may comprise networked devices such as servers, switches, routers, hubs, bridges, gateways, modems, repeaters, access points, etc.

The computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the network 708. The chipset 806 can include functionality for providing network connectivity through a NIC 812, such as a gigabit Ethernet adapter. The NIC 812 is capable of connecting the computer 702 to other computing devices over the network 708 (and/or service provider network 102). It should be appreciated that multiple NICs 812 can be present in the computer 702, connecting the computer to other types of networks and remote computer systems.

The computer 702 can be connected to a storage device 818 that provides non-volatile storage for the computer. The storage device 818 can store an operating system 820, programs 822, and data, which have been described in greater detail herein. The storage device 818 can be connected to the computer 702 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 702 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 818 by detecting the physical states or characteristics of one or more particular locations within the physical storage units.

In addition to the mass storage device 818 described above, the computer 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 702. In some examples, the operations performed by devices in the service provider network 102, and or any components included therein, may be supported by one or more devices similar to computer 702. Stated otherwise, some or all of the operations performed by the messaging service provider 104, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 702.

In one embodiment, the storage device 818 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regard to FIGS. 1-6. The computer 702 can also include computer-readable storage media having instructions stored thereupon for performing any of the other computer-implemented operations described herein.

The computer 702 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise one or more of a router, load balancer, and/or server. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by the router, load balancer, and/or server. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for prioritizing the scanning of incoming messages based on an account status and/or an activity pattern associated with the account receiving the message. That is, the computer 702 may comprise any one of the routers, load balancers, and/or servers. The programs 822 may comprise any type of program that cause the computer 702 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for a messaging platform to prioritize message processing, the method comprising:

receiving, at the messaging platform, a message to be processed and delivered to a messaging account of a user registered with a messaging service;

obtaining, at the messaging platform, account metadata associated with the messaging account;

determining, using the account metadata, an account status indicating a present availability of the user during which the message is to be processed;

determining, at the messaging platform and based on traffic received through a secure email gateway (SEG), account utilization data associated with the messaging account and including computer-centric interactions at the messaging service;

determining an activity pattern based at least in part on the account utilization data;

classifying, based at least in part on the account status and the activity pattern, the message as belonging to a priority class from among a group of priority classes;

based on the priority class of the message, placing the message at a position in a processing queue associated with the messaging platform, wherein the messaging platform processes messages in the processing queue based at least in part on positions of the messages in the processing queue; and processing, by the messaging service, the message based at least in part on the position in the processing queue such that the messaging service processes a limited number of messages in a manner that saves computing resources associated with the messaging platform by reducing virtual machine (VM) instances scaled for all message processing.

2. The method of claim 1, wherein the processing queue is a first processing queue, and the messaging platform is running as a first instance of the messaging platform associated with the first processing queue, further comprising:

determining an availability of resources associated with the first instance of the messaging service or a second instance of the messaging service; and based at least in part on the availability of the resources, moving the message from the first processing queue to a second processing queue associated with the second instance of the messaging service.

3. The method of claim 1, wherein the processing queue is a first processing queue, further comprising:

determining a threshold waiting time associated with the first processing queue;

determining that a waiting time associated with the message violates the threshold waiting time; and moving the message from the first processing queue to a second processing queue based on the waiting time violating the threshold waiting time.

4. The method of claim 1, wherein the priority class is a first priority class, the message is a first message, the account status is a first account status, and the messaging account is a first messaging account, further comprising:

receiving, at the messaging platform, a second message to be processed and delivered to a second messaging account;

classifying, based at least in part on a second account status associated with the second messaging account, the second message as a second priority class from the group of priority classes; and based on the second priority class, placing the second message at another location in the processing queue, wherein the second message is to be processed after the first message.

5. The method of claim 1, wherein obtaining the account metadata comprises one or more of:

analyzing a subject of one or more user messages;

analyzing contents of the one or more user messages;

receiving schedule data from a calendar associated with the messaging account;

or obtaining data indicating user settings associated with the messaging account.

6. A system comprising:

one or more processors; and one or more non-transitory computer-readable media storing computer-executable instructions that, when executed by the one or more processors, cause the one or more processors to perform operations comprising:

receiving, at a messaging platform, a message to be processed and delivered to a messaging account of a user registered with a messaging service;

obtaining, at the messaging platform, account metadata associated with the messaging account;

determining, using the account metadata, an account status indicating a present availability of the user during which the message is to be processed;

determining, at the messaging platform and based on traffic received through a secure email gateway (SEG), account utilization data associated with the messaging account and including computer-centric interactions at the messaging service;

determining, using the account utilization data, an activity pattern;

classifying, based at least in part on the account status and the activity pattern, the message as belonging to a priority class from among a group of priority classes;

based on the priority class of the message, placing the message at a position in a processing queue associated with the messaging platform, wherein the messaging platform processes messages in the processing queue based at least in part on positions of the messages in the processing queue; and processing, by the messaging service, the message based at least in part on the position in the processing queue such that the messaging service processes a limited number of messages in a manner that saves computing resources associated with the messaging platform by reducing virtual machine (VM) instances scaled for all message processing.

7. The system of claim 6, wherein the processing queue is a first processing queue, and the messaging platform is running as a first instance of the messaging platform associated with the first processing queue, the operations further comprising:

determining an availability of resources associated with the first instance of the messaging service or a second instance of the messaging service; and based at least in part on the availability of the resources, moving the message from the first processing queue to a second processing queue associated with the second instance of the messaging service.

8. The system of claim 6, wherein the processing queue is a first processing queue, the operations further comprising:

determining a threshold waiting time associated with the first processing queue;

determining that a waiting time associated with the message violates the threshold waiting time; and moving the message from the first processing queue to a second processing queue based on the waiting time violating the threshold waiting time.

9. The system of claim 6, wherein the priority class is a first priority class, the message is a first message, the account status is a first account status, and the messaging account is a first messaging account, the operations further comprising:

receiving, at the messaging platform, a second message to be processed and delivered to a second messaging account;

classifying, based at least in part on a second account status associated with the second messaging account, the second message as a second priority class from among the group of priority classes; and based on the second priority class, placing the second message at another location in the processing queue, wherein the second message is to be processed after the first message.

10. The system of claim 6, the operations further comprising:

determining an availability of resources associated with the messaging service; and based at least in part on the availability of the resources, placing the message at the position in the processing queue associated with the messaging platform.

11. The system of claim 6, wherein obtaining the account metadata comprises one or more of:

analyzing a subject of one or more user messages;

analyzing contents of the one or more user messages;

receiving schedule data from a calendar associated with the messaging account;

or obtaining data indicating user settings associated with the messaging account.

12. The system of claim 6, wherein obtaining the account utilization data comprises one or more of:

obtaining data indicating that the user opened the messaging service;

obtaining data indicating that the user clicked on links associated with one or more messages;

obtaining data indicating that the user opened attachments associated with the one or more messages;

obtaining data indicating that the user replied to the one or more messages;

or obtaining data indicating that the user deleted the one or more messages.

13. One or more non-transitory computer-readable media storing computer-executable instructions that, when executed by one or more processors, cause the one or more processors to perform operations comprising:

receiving, at a messaging platform, a message to be processed and delivered to a messaging account of a user registered with a messaging service;

determining, at the messaging platform and based on traffic received through a secure email gateway (SEG), account utilization data associated with the messaging account and indicating computer-centric interactions at the messaging service;

determining an account status indicating a present availability of the user during which the message is to be processed;

determining, using the account utilization data, an activity pattern indicating a pattern according to which the user interacts with their messaging account;

classifying, based at least in part on the account status and the activity pattern, the message as belonging to a priority class from among a group of priority classes;

based on the priority class of the message, placing the message at a position in a processing queue associated with the messaging platform, wherein the messaging platform processes messages in the processing queue based at least in part on positions of the messages in the processing queue; and processing, by the messaging service, the message based at least in part on the position in the processing queue such that the messaging service processes a limited number of messages in a manner that saves computing resources associated with the messaging platform by reducing virtual machine (VM) instances scaled for all message processing.

14. The one or more non-transitory computer-readable media of claim 13, wherein the processing queue is a first processing queue, and the messaging platform is running as a first instance of the messaging platform associated with the first processing queue, the operations further comprising:

determining an availability of resources associated with the first instance of the messaging service or a second instance of the messaging service; and based at least in part on the availability of the resources, moving the message from the first processing queue to a second processing queue associated with the second instance of the messaging service.

15. The one or more non-transitory computer-readable media of claim 13, wherein the processing queue is a first processing queue, the operations further comprising:

determining a threshold waiting time associated with the first processing queue;

determining that a waiting time associated with the message violates the threshold waiting time; and moving the message from the first processing queue to a second processing queue based on the waiting time violating the threshold waiting time.

16. The one or more non-transitory computer-readable media of claim 13, wherein the priority class is a first priority class, the message is a first message, the activity pattern is a first activity pattern, and the messaging account is a first messaging account, the operations further comprising:

receiving, at the messaging platform, a second message to be processed and delivered to a second messaging account;

classifying, based at least in part on a second activity pattern associated with the second messaging account, the second message as a second priority class from the group of priority classes; and based on the second priority class, placing the second message at another location in the processing queue, wherein the second message is to be processed after the first message.

17. The one or more non-transitory computer-readable media of claim 13, the operations further comprising:

obtaining, at the messaging platform, account metadata associated with the messaging account;

determining, using the account metadata, an account status indicating an availability of the messaging account; and classifying, based at least in part on the account status and the activity pattern, the message as belonging to a priority class from among a group of priority classes.

18. The one or more non-transitory computer-readable media of claim 13, wherein obtaining the account utilization data comprises one or more of:

obtaining data indicating that the user opened the messaging service;

obtaining data indicating that the user clicked on links associated with one or more messages;

obtaining data indicating that the user opened attachments associated with the one or more messages;

obtaining data indicating that the user replied to the one or more messages;

or obtaining data indicating that the user deleted the one or more messages.

19. The one or more non-transitory computer-readable media of claim 13, wherein:

determining an availability of resources associated with the messaging service; and based at least in part on the availability of the resources, placing the message at the position in the processing queue associated with the messaging platform.

20. The method of claim 1, further comprising:

monitoring the traffic received through the SEG; and determining a traffic pattern associated with the SEG, wherein determining the account utilization data is based at least in part on the traffic pattern.

* * * * *